(12) United States Patent
Iwatani

(10) Patent No.: US 9,026,338 B2
(45) Date of Patent: May 5, 2015

(54) CONTROL APPARATUS FOR INTERNAL COMBUSTION ENGINE

(75) Inventor: Kazuki Iwatani, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 304 days.

(21) Appl. No.: 13/512,101

(22) PCT Filed: Mar. 23, 2010

(86) PCT No.: PCT/JP2010/054985
§ 371 (c)(1),
(2), (4) Date: May 25, 2012

(87) PCT Pub. No.: WO2011/117972
PCT Pub. Date: Sep. 29, 2011

(65) Prior Publication Data
US 2013/0006492 A1    Jan. 3, 2013

(51) Int. Cl.
*G06F 19/00* (2011.01)
*G06G 7/70* (2006.01)
*F01L 1/34* (2006.01)
*F02D 41/00* (2006.01)
*F02D 41/18* (2006.01)
(Continued)

(52) U.S. Cl.
CPC ............ *F02D 41/0002* (2013.01); *F02D 41/18* (2013.01); *F02D 41/40* (2013.01);
(Continued)

(58) Field of Classification Search
CPC .......... F02D 41/0002; F02D 2041/001; F02D 13/023; Y02T 10/42; Y02T 10/18; F01L 2800/00; F01L 1/34
USPC ............. 123/90.15, 90.16, 90.17, 90.18, 321, 123/322, 345, 346, 347, 348, 395, 399; 701/102, 103, 107, 110
See application file for complete search history.

(56) References Cited

U.S. PATENT DOCUMENTS

2006/0037569 A1* 2/2006 Minami et al. ............. 123/90.15
2006/0075996 A1* 4/2006 Yoshino et al. .......... 123/568.14
(Continued)

FOREIGN PATENT DOCUMENTS

JP   8-200135    8/1996
JP   8-284737   10/1996
(Continued)

OTHER PUBLICATIONS

International Search Report in International Application No. PCT/JP2010/054985; Mailing Date: Jun. 15, 2010.

*Primary Examiner* — Mahmoud Gimie
*Assistant Examiner* — Sizo Vilakazi
(74) *Attorney, Agent, or Firm* — Finnegan, Henderson, Farabow, Garrett & Dunner, LLP

(57) ABSTRACT

A control apparatus for an internal combustion engine is provided which can accurately correct a valve timing deviation of an intake valve caused by a variable operating angle mechanism or variable phase mechanism.

A variable operating angle mechanism (28a) for making the operating angle of an intake valve (24) variable is provided. Operating angle command values (operating angles 1 and 3) of two points in front and back at which the intake air amount is decreased by a predetermined amount with respect to the value that is judged to be a maximum value of the intake air amount when the operating angle (command value) is kept changing, are acquired. Then, an intermediate value which is at an equal distance from the operating angle command values of the two points is calculated as the maximum operating angle command value. Then, this maximum operating angle command value is compared with a reference characteristic to execute the calculation of the deviation amount of the valve timing and the correction of the deviation.

13 Claims, 9 Drawing Sheets

(51) Int. Cl.
*F02D 41/40* (2006.01)
*F02D 41/24* (2006.01)
*F02D 13/02* (2006.01)

(52) U.S. Cl.
CPC ....... *F02D2041/001* (2013.01); *F02D 2250/18* (2013.01); *Y02T 10/44* (2013.01); *Y02T 10/42* (2013.01); *F02D 41/2451* (2013.01); *F02D 13/023* (2013.01); *F02D 13/0269* (2013.01); *Y02T 10/18* (2013.01); *Y02T 10/142* (2013.01)

(56) References Cited

U.S. PATENT DOCUMENTS

2008/0167785 A1* 7/2008 Miyakoshi et al. ........... 701/102
2010/0154757 A1* 6/2010 Miyamoto et al. ......... 123/559.1
2011/0073069 A1* 3/2011 Marriott et al. .......... 123/406.12

FOREIGN PATENT DOCUMENTS

| | | |
|---|---|---|
| JP | 2004-76694 | 3/2004 |
| JP | 2005-23806 | 1/2005 |
| JP | 2006-57573 | 3/2006 |
| JP | 2006-132327 | 5/2006 |
| JP | 2007-231799 | 9/2007 |
| JP | 2008-157068 | 7/2008 |
| JP | 2009-85136 | 4/2009 |
| JP | 2009-203829 | 9/2009 |
| JP | 2009-203955 | 9/2009 |

* cited by examiner

*1 Phase advance → air amount increase

*2 First shifted to compression ratio increasing side, thereafter to decreasing side

*3 Correction of operating angle such that IVC is target value based on learning result

*4 Detection and storage of peak point and two points in front and back thereof which have a value decreased by predetermined amount

Fig. 8

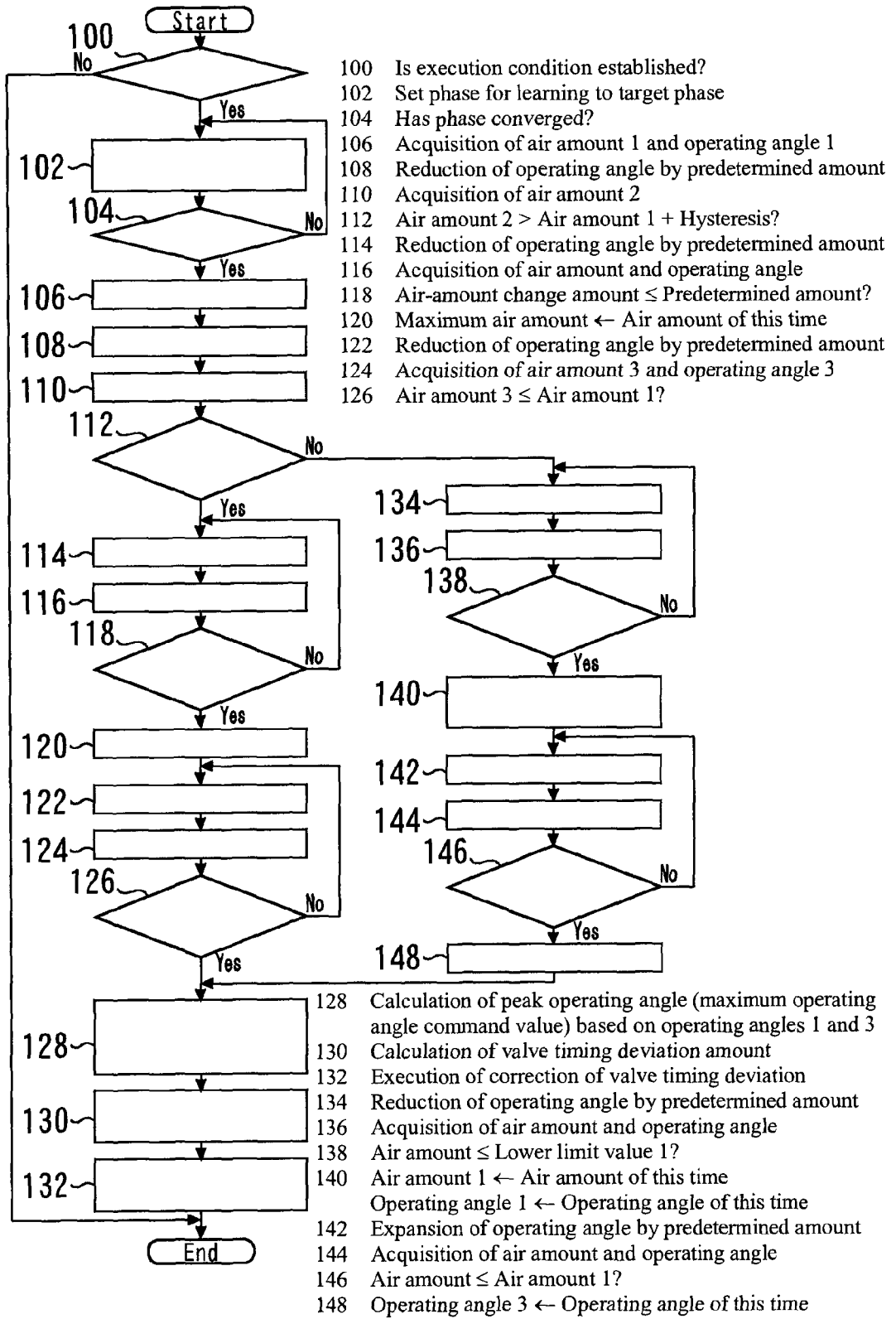

100 Is execution condition established?
102 Set phase for learning to target phase
104 Has phase converged?
106 Acquisition of air amount 1 and operating angle 1
108 Reduction of operating angle by predetermined amount
110 Acquisition of air amount 2
112 Air amount 2 > Air amount 1 + Hysteresis?
114 Reduction of operating angle by predetermined amount
116 Acquisition of air amount and operating angle
118 Air-amount change amount ≤ Predetermined amount?
120 Maximum air amount ← Air amount of this time
122 Reduction of operating angle by predetermined amount
124 Acquisition of air amount 3 and operating angle 3
126 Air amount 3 ≤ Air amount 1?
128 Calculation of peak operating angle (maximum operating angle command value) based on operating angles 1 and 3
130 Calculation of valve timing deviation amount
132 Execution of correction of valve timing deviation
134 Reduction of operating angle by predetermined amount
136 Acquisition of air amount and operating angle
138 Air amount ≤ Lower limit value 1?
140 Air amount 1 ← Air amount of this time
    Operating angle 1 ← Operating angle of this time
142 Expansion of operating angle by predetermined amount
144 Acquisition of air amount and operating angle
146 Air amount ≤ Air amount 1?
148 Operating angle 3 ← Operating angle of this time

Fig. 9

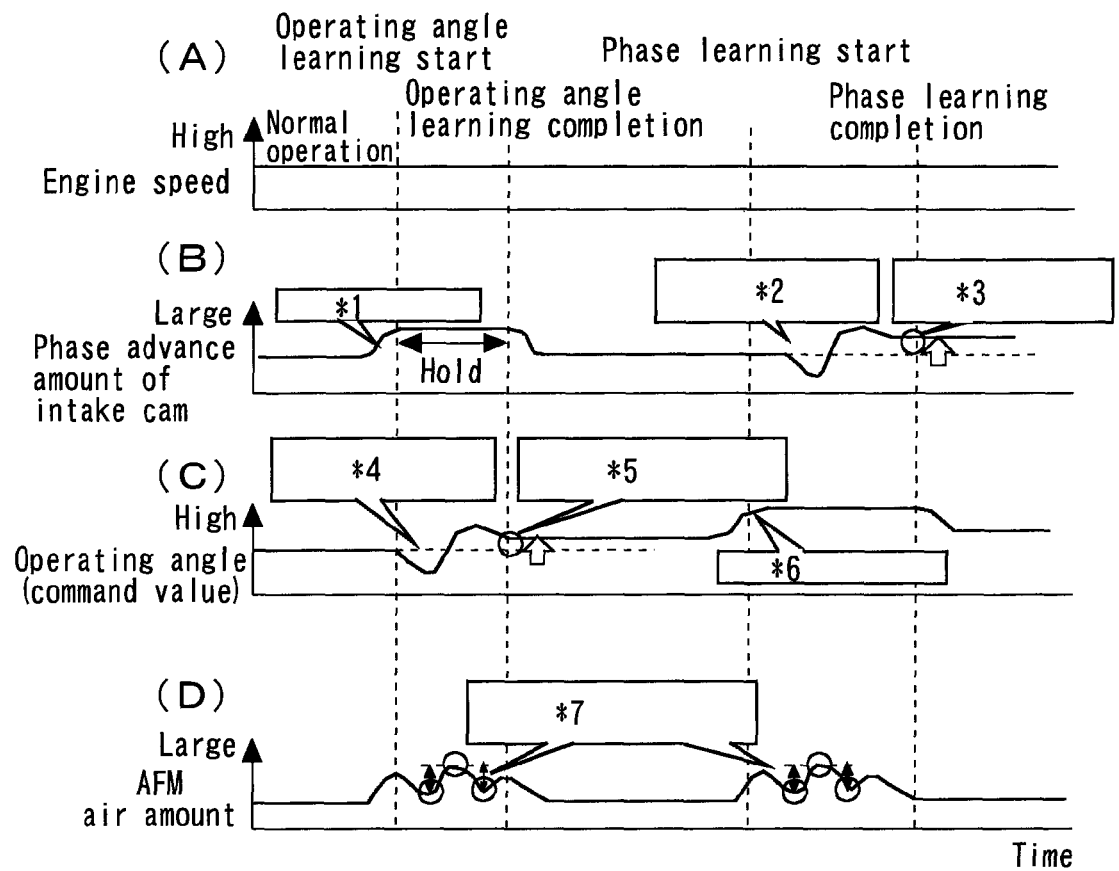

*1 Phase advance → air amount increase

*2 First shifted to air amount increasing side, thereafter to decreasing side

*3 Correction of phase so as to be target value based on learning result

*4 First shifted to compression ratio increasing side, thereafter to decreasing side

*5 Correction of operating angle such that IVC is target value based on learning result

*6 Operating angle expansion → air amount increase

*7 Detection and storage of peak point and two points in front and back thereof which have a value decreased by predetermined amount

Fig. 11

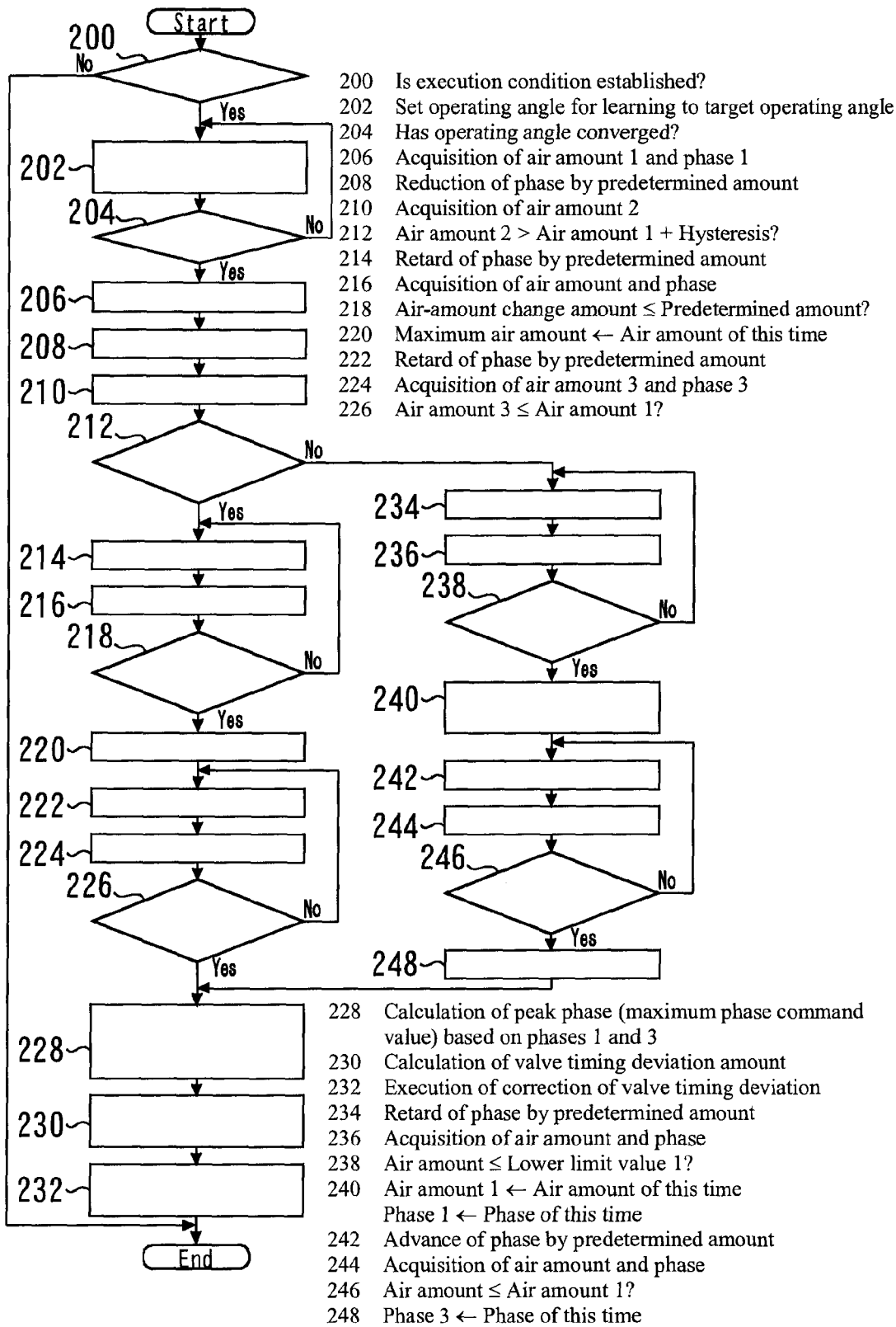

200 Is execution condition established?
202 Set operating angle for learning to target operating angle
204 Has operating angle converged?
206 Acquisition of air amount 1 and phase 1
208 Reduction of phase by predetermined amount
210 Acquisition of air amount 2
212 Air amount 2 > Air amount 1 + Hysteresis?
214 Retard of phase by predetermined amount
216 Acquisition of air amount and phase
218 Air-amount change amount ≤ Predetermined amount?
220 Maximum air amount ← Air amount of this time
222 Retard of phase by predetermined amount
224 Acquisition of air amount 3 and phase 3
226 Air amount 3 ≤ Air amount 1?

228 Calculation of peak phase (maximum phase command value) based on phases 1 and 3
230 Calculation of valve timing deviation amount
232 Execution of correction of valve timing deviation
234 Retard of phase by predetermined amount
236 Acquisition of air amount and phase
238 Air amount ≤ Lower limit value 1?
240 Air amount 1 ← Air amount of this time
    Phase 1 ← Phase of this time
242 Advance of phase by predetermined amount
244 Acquisition of air amount and phase
246 Air amount ≤ Air amount 1?
248 Phase 3 ← Phase of this time

CONTROL APPARATUS FOR INTERNAL COMBUSTION ENGINE

CROSS-REFERENCE TO RELATED APPLICATIONS

This application is a national phase application of International Application No. PCT/JP2010/054985, filed Mar. 23, 2010, the content of which is incorporated herein by reference.

TECHNICAL FIELD

The present invention relates to a control apparatus for an internal combustion engine, and particularly to a control apparatus for an internal combustion engine including a variable valve operating mechanism which includes at least one of a variable operating angle mechanism and a variable phase mechanism.

BACKGROUND ART

Previously, for example, Patent Document 1 discloses a gasoline engine including a variable lift mechanism that makes a lift characteristic of an intake valve variable, and a variable valve timing mechanism that makes an opening/closing timing of the intake valve variable by advancing or retarding the central phase of an operating angle of the intake vale. This conventional gasoline engine is configured to perform learning of an error in the control of intake air amount (error between the designed value of the intake air amount and the detected value of the intake air amount by an air flow meter) through the adjustment of the lift characteristic of the intake valve.

It is noted that the present applicant recognizes the following literatures cited blow including the above described one as those relating to the present invention.

CITATION LIST

Patent Documents

[Patent Document 1] Japanese Laid-open Patent Application Publication No. 2009-085136
[Patent Document 2] Japanese Laid-open Patent Application Publication No. 2009-203829
[Patent Document 3] Japanese Laid-open Patent Application Publication No. 2006-132327

SUMMARY OF INVENTION

Technical Problem

The conventional learning method described in Patent Document 1 described above is predicated on that it is used in a gasoline engine in which torque is controlled by the adjustment of the intake air amount. Therefore, this conventional art is configured to perform correction by placing more value on the adaptation of the intake air amount, which varies in response to the adjustment of the lift characteristic, to an aimed value than the correction of the valve timing of the intake valve.

In a compression ignition type internal combustion engine such as a diesel engine, there is a case where at least one of a variable operating angle mechanism that makes the operating angle of the intake valve variable, and a variable phase mechanism that makes the rotational phase of an intake cam variable with respect to the rotational phase of a crankshaft may be used. In such a case, if the valve timing (especially the closing timing) controlled by those variable valve operating mechanisms is deviated from a reference value (design value), a deviation of an actual compression ratio occurs. As a result of this, there may be adverse effects on the drivability and exhaust emissions of internal combustion engine.

The present invention has been made in order to solve the above described problems, and has its object to provide a control apparatus for an internal combustion engine that can accurately correct a deviation of the valve timing of an intake valve caused by a variable operating angle mechanism or a variable phase mechanism.

Solution to Problem

A first aspect of the present invention is a control apparatus for an internal combustion engine, comprising:
a variable operating angle mechanism which makes an operating angle of an intake valve variable;
operating angle control means which controls the variable operating angle mechanism based on an operating angle command value relating to the operating angle of the intake valve;
air amount acquisition means which acquires an intake air amount of the internal combustion engine;
estimation means which estimates a maximum operating angle command value at which the intake air amount indicates a maximum value in association with a change of the operating angle command value, based on a value of the intake air amount acquired during a control of the operating angle of the intake valve based on each of the operating angle command values of at least two points; and
correction means which corrects a deviation of a valve timing of the intake valve by comparing the maximum operating angle command value estimated by the estimation means with a reference value.

A second aspect of the present invention is the control apparatus for an internal combustion engine according to the first aspect of the present invention,
wherein the internal combustion engine further comprises:
a variable phase mechanism which makes a rotational phase of an intake cam that drives the intake valve variable with respect to a rotational phase of a crankshaft; and
phase control means which controls the variable phase mechanism based on a phase command value relating to the rotational phase of the intake cam, and
wherein the phase control means includes phase locking control means for controlling the variable phase mechanism such that the rotational phase of the intake cam coincides with a fixed value at a start of estimation of the maximum operating angle command value by the estimation means.

A third aspect of the present invention is the control apparatus for an internal combustion engine according to the second aspect of the present invention,
wherein the fixed value is a value to which the rotational phase of the intake cam is adjusted such that an intake air amount is larger than a value at an operating condition when the estimation of the maximum operating angle command value by the estimation means is started.

A fourth aspect of the present invention is the control apparatus for an internal combustion engine according to any one of the first to third aspects of the present invention, wherein the operating angle command values of the at least two points include operating angle command values of two points between which an operating angle command value exists at which an intake air amount is judged to indicate a maximum value.

A fifth aspect of the present invention is the control apparatus for an internal combustion engine according to the fourth aspect of the present invention, wherein the estimation means includes maximum command value calculation means for calculating, as the maximum operating angle command value, an intermediate value which is at an equal distance from the operating angle command values of the two points between which the operating angle command value exists at which an intake air amount is judged to indicate a maximum value.

A sixth aspect of the present invention is the control apparatus for an internal combustion engine according to any one of the first to fifth aspects of the present invention, wherein the estimation means includes command value changing means for first changing the operating angle command value in a direction in which an actual compression ratio of the internal combustion engine increases, at a start of estimation of the maximum operating angle command value.

A seventh aspect of the present invention is the control apparatus for an internal combustion engine according to any one of the first to sixth aspects of the present invention, wherein the estimation means includes command-value change restriction means for restricting change of the operating angle command value such that an intake air amount does not become equal to or less than a predetermined lower limit value at a time of estimation of the maximum operating angle command value.

An eighth aspect of the present invention is the control apparatus for an internal combustion engine according to any one of the second to seventh aspects of the present invention, further comprising:

second estimation means which estimates a maximum phase command value at which an intake air amount indicates a maximum value in association with a change of the phase command value, based on the value of the intake air amount acquired during the control of the rotational phase of the intake cam based on each of the phase command values of at least two points after the estimation of the maximum operating angle command value by the estimation means; and second correction means which corrects a deviation of the valve timing of the intake valve by comparing the maximum phase command value estimated by the second estimation means with a second reference value, wherein the operating angle control means includes operating angle locking control means for controlling the variable operating angle mechanism such that the operating angle of the intake valve coincides with a fixed value at a start of estimation of the maximum phase command value by the second estimation means.

A ninth aspect of the present invention is the control apparatus for an internal combustion engine according to any one of the first to eighth aspects of the present invention, further comprising:

injection amount adjustment means which adjusts a fuel injection amount such that torque of the internal combustion engine does not change in association with a change of the operating angle command value at a time of estimation of the maximum operating angle command value by the estimation means.

A tenth aspect of the present invention is the control apparatus for an internal combustion engine according to the eighth aspect of the present invention, further comprising:

second injection amount adjustment means which adjusts a fuel injection amount such that torque of the internal combustion engine does not change in association with a change of the phase command value at a time of estimation of the phase command value by the second estimation means.

An eleventh aspect of the present invention is the control apparatus for an internal combustion engine according to any one of the first to tenth aspects of the present invention, wherein the estimation means executes the estimation of the maximum operating angle command value during a steady state operation of the internal combustion engine.

A twelfth aspect of the present invention is the control apparatus for an internal combustion engine according to the eighth aspect of the present invention, wherein the second estimation means executes the estimation of the phase command value during a steady state operation of the internal combustion engine.

A thirteenth aspect of the present invention is a control apparatus for an internal combustion engine, comprising:

a variable phase mechanism which makes a rotational phase of an intake cam that drives an intake valve variable with respect to a rotational phase of a crankshaft;

phase control means which controls the variable phase mechanism based on a phase command value relating to the rotational phase of the intake cam;

air amount acquisition means which acquires an intake air amount of the internal combustion engine;

estimation means which estimates a maximum phase command value at which the intake air amount indicates a maximum value in association with a change of the phase command value, based on a value of the intake air amount acquired during a control of the rotational phase of the intake cam based on each of the phase command values of at least two points; and correction means which corrects a deviation of the valve timing of the intake valve by comparing the maximum phase command value estimated by the estimation means with a reference value.

A fourteenth aspect of the present invention is the control apparatus for an internal combustion engine according to the thirteenth aspect of the present invention, wherein the internal combustion engine further comprises:

variable operating angle mechanism which makes an operating angle of the intake valve variable; and operating angle control means which controls the variable operating angle mechanism based on an operating angle command value relating to the operating angle of the intake valve, and wherein the operating angle control means includes operating angle locking control means for controlling the variable operating angle mechanism such that the operating angle of the intake valve coincides with a fixed value at a start of estimation of the maximum phase command value by the estimation means.

A fifteenth aspect of the present invention is the control apparatus for an internal combustion engine according to the fourteenth aspect of the present invention, wherein the fixed value is a value to which the operating angle of the intake valve is adjusted such that an intake air amount is larger than a value at an operating condition when estimation of the maximum phase command value by the estimation means is started.

A sixteenth aspect of the present invention is the control apparatus for an internal combustion engine according to any one of the thirteenth to fifteenth aspects of the present invention,
  wherein the phase command values of the at least two points include phase command values of two points between which a phase command value exists at which an intake air amount is judged to indicate a maximum value.

A seventh aspect of the present invention is the control apparatus for an internal combustion engine according to the sixteenth aspect of the present invention,
  wherein the estimation means includes maximum command value calculation means for calculating, as the maximum phase command value, an intermediate value which is at an equal distance from the phase command values of the two points between which the phase command value exists at which an intake air amount is judged to indicate a maximum value.

An eighteenth aspect of the present invention is the control apparatus for an internal combustion engine according to any one of the thirteenth to seventh aspects of the present invention,
  wherein the estimation means includes command value changing means for first changing the phase command value in a direction in which an intake air amount increases at a start of estimation of the maximum phase command value.

A nineteenth aspect of the present invention is the control apparatus for an internal combustion engine according to any one of the thirteenth to eighth aspects of the present invention,
  wherein the estimation means includes command-value change restriction means for restricting a change of the phase command value such that an intake air amount does not become equal to or less than a predetermined lower limit value at a time of estimation of the maximum phase command value.

A twentieth aspect of the present invention is the control apparatus for an internal combustion engine according to any one of the fourteenth to nineteenth aspects of the present invention, further comprising:
  second estimation means which estimates a maximum operating angle command value at which an intake air amount indicates a maximum value in association with a change of the operating angle command value, based on a value of the intake air amount acquired during a control of the operating angle of the intake valve based on each of the operating angle command values of at least two points after the estimation of the maximum phase command value by the estimation means; and
  second correction means which corrects a deviation of the valve timing of the intake valve by comparing the maximum operating angle command value estimated by the second estimation means with a second reference value,
  wherein the phase control means includes phase locking control means for controlling the variable phase mechanism such that the rotational phase of the intake cam coincides with a fixed value at a start of estimation of the maximum operating angle command value by the second estimation means.

A twenty-first aspect of the present invention is the control apparatus for an internal combustion engine according to any one of the thirteenth to twentieth aspects of the present invention, further comprising:
  injection amount adjustment means which adjusts a fuel injection amount such that torque of the internal combustion engine does not change in association with a change of the phase command value at a time of estimation of the maximum phase command value by the estimation means.

A twenty-second aspect of the present invention is the control apparatus for an internal combustion engine according to the twentieth aspect of the present invention, further comprising:
  second injection amount adjustment means which adjusts a fuel injection amount so that torque of the internal combustion engine does not change in association with a change of the operating angle command value at a time of estimation of the maximum operating angle command value by the second estimation means.

A twenty-third aspect of the present invention is the control apparatus for an internal combustion engine according to any one of the thirteenth to twenty-second aspects of the present invention,
  wherein the estimation means executes the estimation of the maximum phase command value during a steady state operation of the internal combustion engine.

A twenty-fourth aspect of the present invention is the control apparatus for an internal combustion engine according to the twentieth aspect of the present invention,
  wherein the second estimation means executes the estimation of the maximum operating angle command value during a steady state operation of the internal combustion engine.

Advantageous Effects of Invention

According to the first aspect of the present invention, the maximum operating angle command value at which the intake air amount indicates a maximum value in association with the change of operating angle command value is estimated based on the value of the intake air amount acquired during the control of the operating angle of the intake valve based on each of the operating angle command values of at least two points. And it becomes possible to accurately grasp the deviation amount of the valve timing of the intake valve by comparing the estimated maximum operating angle command value with a reference value. Therefore, according to the present invention, it is possible to correct the deviation of the valve timing of the intake valve by using the result of comparison between the estimated maximum operating angle command value and the reference value.

According to the second aspect of the present invention, in a case where a variable operating angle mechanism as well as a variable phase mechanism are provided, it is possible to accurately correct the deviation of the valve timing caused by the variable operating angle mechanism without being affected by the adjustment of the variable phase mechanism.

According to the third aspect of the present invention, it is possible to increase the sensitivity of the intake air amount with respect to the change of the operating angle command value, thereby increasing the detection accuracy of the valve timing deviation.

According to the fourth aspect of the present invention, even in a case where there is a variation in the acquired value of the intake air amount acquired by the air amount acquisition means, it becomes possible to accurately estimate the maximum operating angle command value.

According to the fifth aspect of the present invention, even in a case where the detection of the maximum value of the intake air amount is difficult since the change of the intake air amount is small with respect to the change amount of the operating angle in the vicinity of the maximum value of the intake air amount, it becomes possible to accurately acquire the maximum operating angle command value.

According to the sixth aspect of the present invention, it is possible to prevent the decrease of compression end temperature, and the occurrence of white smoke and misfire due to an inadvertent adjustment of the operating angle command value during execution of the estimation of the maximum operating angle command value.

According to the seventh aspect of the present invention, it is possible to prevent the occurrence of smoke and misfire, and the deterioration of drivability.

According to the eighth aspect of the present invention, it is possible to improve the accuracy of the correction of the valve timing deviation as a whole of the intake variable valve operating apparatus by executing not only the correction process of the valve timing deviation caused by the variable operating angle mechanism, but also the correction process of the valve timing deviation caused by the variable phase mechanism.

According to the ninth aspect of the present invention, it is possible to prevent the drivability of the internal combustion engine from deteriorating in association with the execution of the estimation process of the maximum operating angle command value.

According to the tenth aspect of the present invention, it is possible to prevent the drivability of the internal combustion engine from deteriorating in association with the execution of the estimation process of the maximum phase command value.

According to the eleventh aspect of the present invention, it becomes possible to accurately detect the deviation of the valve timing by executing the estimation process of the maximum operating angle command value under a condition in which the operating state of the internal combustion engine is stabilized.

According to the twelfth aspect of the present invention, it becomes possible to accurately detect the deviation of the valve timing by executing the estimation process of the maximum phase command value under a condition in which the operating state of the internal combustion engine is stabilized.

According to the thirteenth aspect of the present invention, the maximum phase command value at which the intake air amount indicates a maximum value in association with the change of phase command value is estimated based on the value of the intake air amount acquired during the control of the rotational phase of the intake cam based on each of the phase command values of at least two points. Then, it becomes possible to accurately grasp the deviation amount of the valve timing of the intake valve by comparing the estimated maximum phase command value with a reference value. Thus, according to the present invention, it is possible to correct the deviation of the valve timing of the intake valve using the comparison result between the estimated maximum phase command value and the reference value.

According to the fourteenth aspect of the present invention, in a case where the variable phase mechanism as well as the variable operating angle mechanism is provided, it is possible to accurately correct the deviation of the valve timing caused by the variable phase mechanism without being affected by the adjustment of the variable operating angle mechanism.

According to the fifteenth aspect of the present invention, it is possible to improve the sensitivity of the intake air amount with respect to the change of the phase command value, thereby improving the detection accuracy of the valve timing deviation.

According to the sixteenth aspect of the present invention, even in a case where there is a variation in the value of the intake air amount acquired by the air amount acquisition means, it becomes possible to accurately estimate the maximum phase command value.

According to the seventeenth aspect of the present invention, even in a case where the detection of a maximum value is difficult since the change of intake air amount with respect to the change amount of the phase is small in the vicinity of the maximum value of the intake air amount, it becomes possible to accurately acquire the maximum phase command value.

According to the eighteenth aspect of the present invention, it is possible to prevent the compression end temperature from decreasing, and white smoke and misfire from occurring due to an inadvertent adjustment of the phase command value during execution of the estimation of the maximum phase command value.

According to the nineteenth aspect of the present invention, it is possible to prevent the occurrence of smoke and misfire, and the deterioration of drivability.

According to the twentieth aspect of the present invention, it is possible to improve the accuracy of the correction of the valve timing deviation as a whole of the intake variable valve operating apparatus by executing not only the correction process of the valve timing deviation by the variable phase mechanism, but also the correction process of the valve timing deviation by the variable operating angle mechanism.

According to the twenty-first aspect of the present invention, it is possible to prevent the drivability of the internal combustion engine from deteriorating in association with the execution of the estimation process of the maximum phase command value.

According to the twenty-second aspect of the present invention, it is possible to prevent the drivability of the internal combustion engine from deteriorating in association with the execution of the estimation process of the maximum operating angle command value.

According to the twenty-third aspect of the present invention, it becomes possible to accurately detect the deviation of the valve timing by executing the estimation process of the maximum phase command value under a condition in which the operating state of the internal combustion engine is stabilized.

According to the twenty-fourth aspect of the present invention, it becomes possible to accurately detect the deviation of the valve timing by executing the estimation process of the maximum operating angle command value under a condition in which the operating state of the internal combustion engine is stabilized.

BRIEF DESCRIPTION OF DRAWINGS

FIG. 8 is a flowchart of a routine that is executed in the first embodiment of the present invention;

FIG. 9 is a timing chart to explain the detection (learning) method of the deviation amount of the valve timing according to the second embodiment of the present invention;

FIG. 11 is a flowchart of a routine that is executed in the second embodiment of the present invention.

DESCRIPTION OF EMBODIMENTS

First Embodiment

Description of System Configuration

Figure 1:
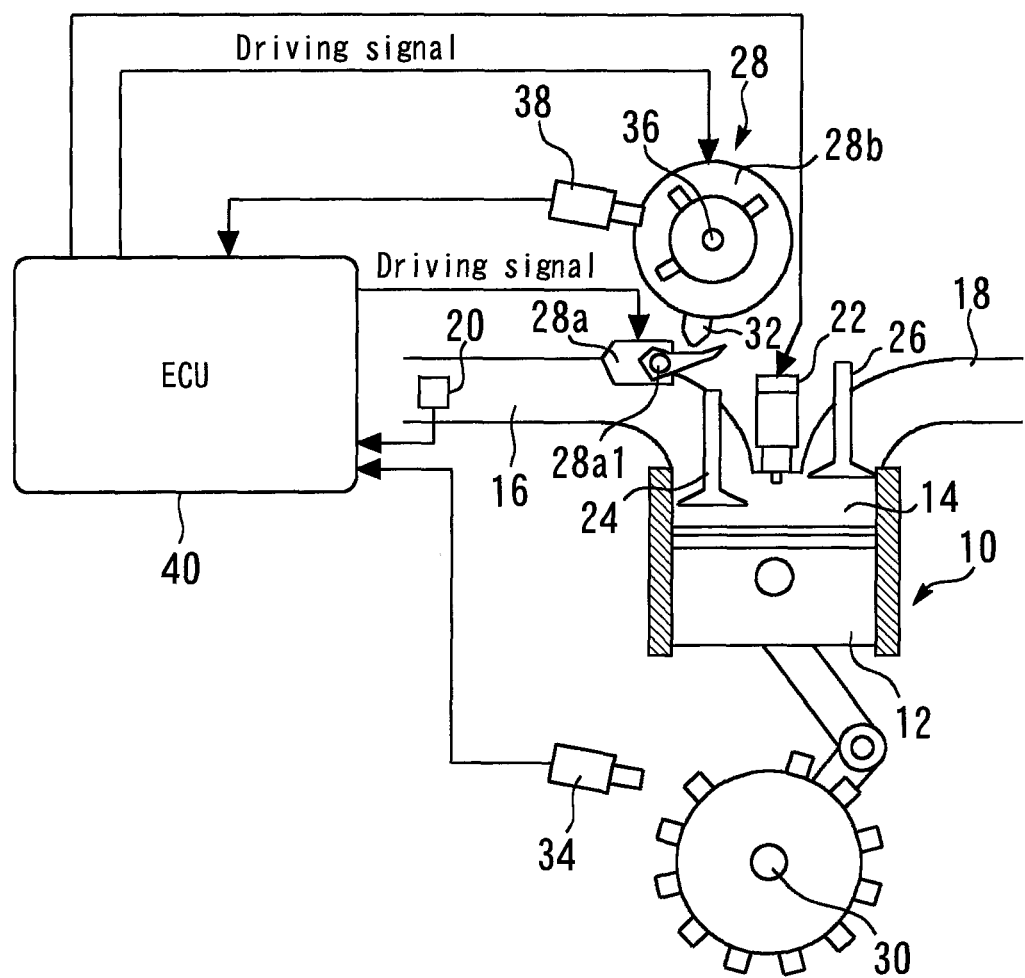
FIG. 1 is a diagram to explain a system configuration according to a first embodiment of the present invention.

FIG. 1 is a diagram to explain the system configuration according to the first embodiment of the present invention. The system shown in FIG. 1 includes a compression ignition type internal combustion engine 10. Here, the internal combustion engine 10 is supposed to be an inline 4-cylinder type diesel engine as an example of the compression ignition type internal combustion engine.

A piston 12 is provided in a cylinder of the internal combustion engine 10. A combustion chamber 14 is formed on the top side of the piston 12 in the cylinder of the internal combustion engine 10. There are an intake passage 16 and an exhaust passage 18 in communication with the combustion chamber 14.

An air flow meter 20 that outputs a signal corresponding to the flow rate of air sucked into the intake passage 16 is provided in the vicinity of an inlet of the intake passage 16. A fuel injection valve 22 for directly injecting fuel into a cylinder is provided in each cylinder of the internal combustion engine 10. An intake valve 24 and an exhaust valve 26 for turning the combustion chamber 14 and the intake passage 16, or the combustion chamber 14 and the exhaust passage 18 into a conduction state or a shut-off state are provided in an intake port and an exhaust port, respectively.

Moreover, the system shown in FIG. 1 includes an intake variable valve operating apparatus 28 as a valve operating apparatus for driving the intake valve 24 for each cylinder. The intake variable valve operating apparatus 28 is a mechanism that includes: a variable operating angle mechanism 28a for making the operating angle of the intake valve 24 continuously variable; and a variable phase mechanism (a variable valve timing mechanism) 28b for making the rotational phase of an intake cam 32 continuously variable with respect to the rotational phase of a crankshaft 30. It is noted that the detailed description of the variable operating angle mechanism 28a will be omitted herein since a variable valve operating apparatus having a configuration similar to that is described in detail in, for example, International Publication No. WO2006/132059.

Further, a crank angle sensor 34 for detecting a crank angle and an engine rotational speed is disposed in the vicinity of the crankshaft 30. Moreover, an intake cam angle sensor 38 for detecting a rotational position (advance amount) of an intake camshaft 36 is disposed in the vicinity of the intake camshaft 36.

The system of the present embodiment includes an ECU (Electronic Control Unit) 40. The ECU 40 is connected with various sensors such as the above described air flow meter 20, as well as with various actuators such as the above described fuel injection valve 22 and the intake variable valve operating apparatus 28. The ECU 40 controls the operating state of the internal combustion engine 10 by driving each actuator according to predetermined programs, based on those sensor signals and information.

Figure 2:
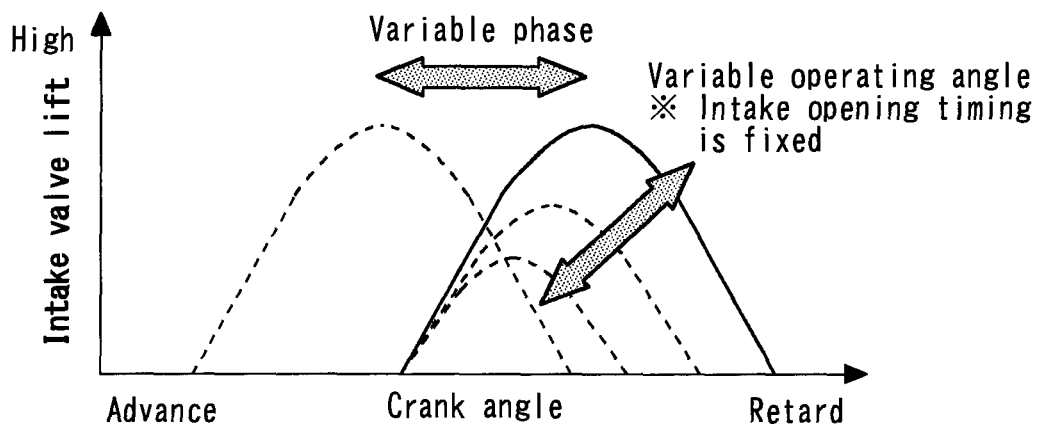
FIG. 2 is a diagram to represent valve lift characteristics of an intake valve implemented by an intake variable valve operating apparatus shown in FIG. 1.

FIG. 2 is a diagram to represent valve lift characteristics of the intake valve 24 implemented by the intake variable valve operating apparatus 28 shown in FIG. 1.

The above described variable operating angle mechanism 28a is configured to rotationally drive a control shaft 28a1 by using an actuator (electronic motor) or the like which is omitted from illustration based on a driving signal (operating angle command value) from the ECU 40. This enables the variable operating angle mechanism 28a to continuously change the operating angle and the lift amount of the intake valve 24 with the opening timing thereof being fixed at an approximately constant value. That is, according to such variable operating angle mechanism 28a, it is possible to continuously change the closing timing of the intake valve 24.

Moreover, the above described variable phase mechanism 28b is configured to relatively change the rotational phase of the intake cam 32 (the intake camshaft 36) with respect to the rotational phase of the crankshaft 30 by using a hydraulic or electric actuator which is omitted from illustration based on a drive signal (phase command value) from the ECU 40. This enables the variable phase mechanism 28b to continuously change the opening and closing timings of the intake valve 24 with the operating angle thereof being kept constant as shown in FIG. 2.

[Correction Method of Valve Timing Deviation of the First Embodiment]

The above described variable operating angle mechanism 28a and variable phase mechanism 28b have a variation in the lift characteristics of the intake valve 24 caused by a tolerance during manufacturing or changes with time due to wear, and the like. If the closing timing of the intake valve 24 changes, the actual compression ratio of the internal combustion engine 10 changes and thus the compression end temperature changes. Therefore, in order to achieve better combustion in the internal combustion engine 10 which is a diesel engine, it is required to be able to accurately correct the deviation of valve timing (especially, closing timing) of the intake valve 24 caused by variations that each of the variable operating angle mechanism 28a and the variable phase mechanism 28b inheres.

Accordingly, the present embodiment is arranged such that the operating angle command value of the intake valve 24 is varied to drive only the variable operating angle mechanism 28a in a state in which the variable phase mechanism 28b is stopped to fix the rotational phase of the intake valve 24 during a steady state operation of the internal combustion engine 10. Then, when only this variable operating angle mechanism 28a is driven, it is arranged to estimate the deviation amount of valve timing (closing timing) of the intake valve 24 with respect to a reference characteristic based on the learning result of the characteristics of the intake air amount detected by the air flow meter 20. In addition to that, the valve timing of the intake valve 24 is corrected so as to agree with an aimed value (of the reference characteristic) based on the estimated deviation amount of the valve timing.

Figure 3:
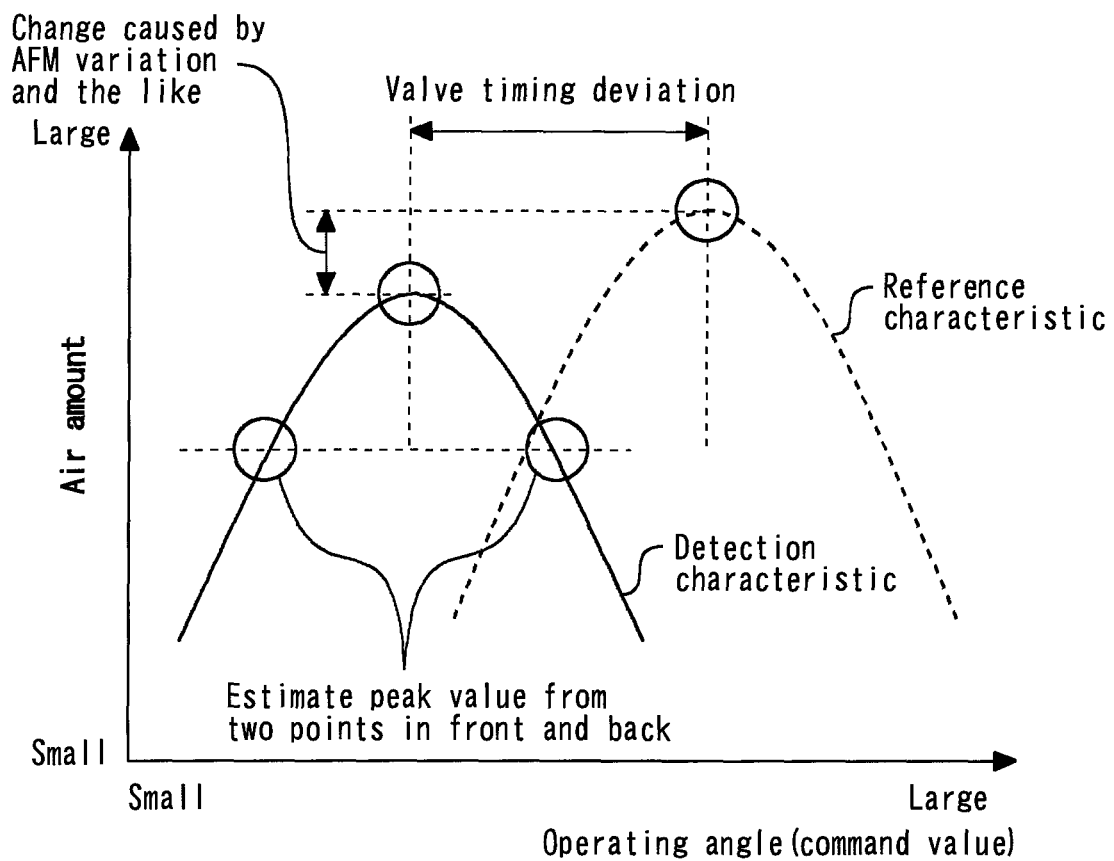
FIG. 3 is a diagram to explain the detection principle of valve timing deviation of the intake valve in the first embodiment of the present invention which utilizes the intake air amount characteristics during an operating angle adjustment.

FIG. 3 is a diagram to explain the detection principle of the valve timing deviation of the intake valve 24 in the first embodiment of the present invention which utilizes the intake air amount characteristics during an operating angle adjustment. It is noted that the curve shown by a broken line in FIG. 3 represents a reference characteristic of air amount during the operating angle adjustment by the variable operating angle mechanism 28a when there is no valve timing deviation, and the curve shown by a solid line in FIG. 3 represents a detection characteristic of air amount detected by the air flow meter 20 during the operating angle adjustment by the variable operating angle mechanism 28a when there is a valve timing deviation, and there is also a deviation in the detection value of the air flow meter 20. To be more specific, FIG. 3 shows a case where a valve timing deviation of the variable operating angle mechanism 28a has occurred in the smaller operating angle direction with respect to a reference characteristic of intake air amount, and a deviation of intake air amount caused by the variation in the detection value of the air flow meter 20 has occurred.

The present embodiment has its object to accurately estimate the deviation amount of the valve timing (closing timing) of the intake valve 24 which is represented by the difference between the operating angle command value when the intake air amount shows a maximum value in the reference characteristic, and the operating angle command value when the intake air amount shows a maximum value in the detection characteristic, as shown in FIG. 3. However, as shown in FIG. 3, there is a variation in the detection value of the air flow meter 20. Therefore, by simply acquiring a detection value of the intake air amount at an operating angle command value of one point, it is not possible to judge whether the deviation of a detection characteristic with respect to the reference characteristic is due to the deviation in the lateral direction of FIG. 3 (that is, deviation of valve timing), or due to the deviation in the longitudinal direction of FIG. 3 (that is, deviation of the air amount caused by the variation of the air flow meter 20).

Accordingly, the present embodiment is arranged such that the detection characteristic (solid line) is grasped in such a form that a peak value (maximum value) of the intake air amount during the change of the operating angle command value is recognizable by acquiring detection values (white circle) of the intake air amount at the operating angle command values of at least three points as shown in FIG. 3. This makes it possible to grasp how much the deviation of the valve timing (operating angle) of the intake valve 24 is in the lateral direction of FIG. 3, regardless of the deviation of longitudinal direction of FIG. 3 (the deviation of air amount caused by the variation of the air flow meter 20).

Moreover, the present embodiment also has a characteristic calculation method of the operating angle command value at which the intake air amount indicates a maximum value (maximum operating angle command value). That is, the present embodiment is not arranged such that the operating angle command value when a detection value of the intake air amount by the air flow meter 20 is judged to show a maximum value (herein, referred to as a "tentative maximum operating angle command value") is used as the maximum operating angle command value as it is in a situation in which the operating angle is kept changing. Instead, it is arranged such that an intermediate value that is at an equal distance from the operating angle command values of two points in front and back at which the intake air amount is decreased by a predetermined amount with respect to the intake air amount when it is controlled at the above described tentative maximum operating angle command value, is calculated as the maximum operating angle command value which provides the base for the correction of the valve timing.

According to the method as described above, it becomes possible to accurately estimate the deviation amount of the valve timing for the following reason. That is, the change amount of the intake air amount actually becomes smaller with respect to the change amount of the operating angle (command value) in the vicinity of the maximum value of the intake air amount. Further, as already described, there is a variation in the detection value of the air flow meter 20. Therefore, it is difficult to accurately determine a peak value (a maximum value) of the intake air amount while gradually changing the operating angle command value in one direction. In contrast to this, in the method of the present embodiment, it is arranged such that through backward calculation from operating angle command values of two points in front and back at which the intake air amount is decreased by a predetermined amount with respect to a value which is judged to be a peak value (maximum value) of the intake air amount when the operating angle command value is kept changing, an intermediate value which is at an equal distance from the two points is calculated as the maximum operating angle command value. For this reason, even when it is difficult to detect a peak value since the change of the intake air amount is small with respect to the change amount of the operating angle in the vicinity of the peak value (maximum value) of the intake air amount, it becomes possible to accurately acquire a maximum operating angle command value when the intake air amount indicates the peak value (maximum value). Moreover, it becomes possible to accurately calculate the maximum operating angle command value without being affected by the variation in the detection value of the air flow meter 20, by calculating the maximum operating angle command value from the operating angle command values of two points between which an operating angle command value exists at which the intake air amount is judged to indicate a maximum value.

Next, referring to FIGS. 4 to 7, the concrete procedure when detecting the deviation amount of valve timing in the present embodiment will be described.

Figure 4:
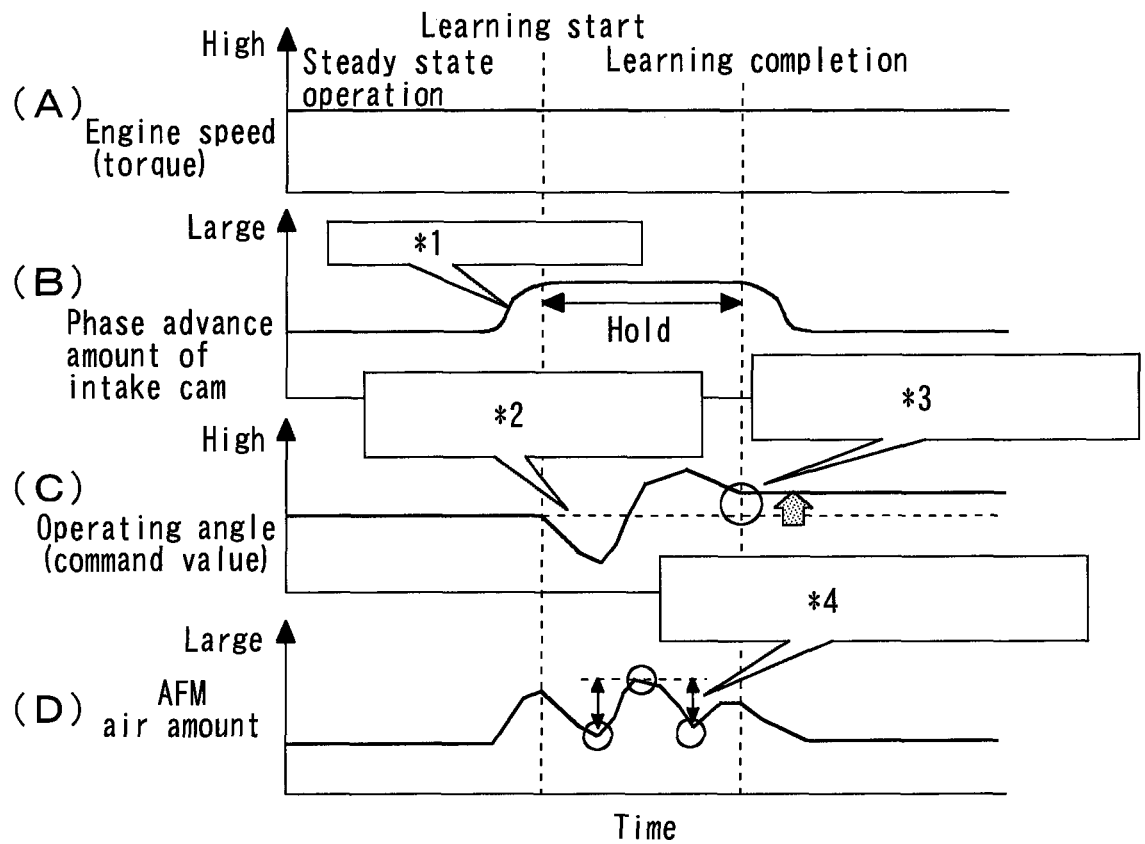
FIG. 4 is a timing chart to explain the method of detecting (learning) the deviation amount of the valve timing in the first embodiment of the present invention.

FIG. 4 is a timing chart to explain the method of detecting (learning) the deviation amount of the valve timing in the first embodiment of the present invention. To be more specific, FIG. 4(A) shows a waveform of engine rotational speed (the same as torque); FIG. 4(B) a waveform of advance amount (phase command value) of the rotational phase of the intake cam 32 by the variable phase mechanism 28b; FIG. 4(C) a waveform of operating angle (command value) of the intake valve 24 by the variable operating angle mechanism 28a; and FIG. 4(D) a waveform of the detection value of the intake air amount by the air flow meter (AFM) 20, respectively.

As shown in FIG. 4(A), this learning method is executed during a steady state operation (for example, during idling) in which the engine rotational speed (and torque) is stable. Moreover, upon execution of the learning of the present embodiment, as shown in FIG. 4(B), the rotational phase (hereafter, may be simply referred to as the "phase") of the intake cam 32 is adjusted so as to be a phase which causes the intake air amount to further increase (preferably to be maximized) under the current operating condition by using the variable phase mechanism 28b, before changing the operating angle command value for the variable operating angle mechanism 28a. Then, during the execution of the present learning, the variable phase mechanism 28b is stopped such that the phase of the intake cam 32 is held at the above described phase.

Figure 5:
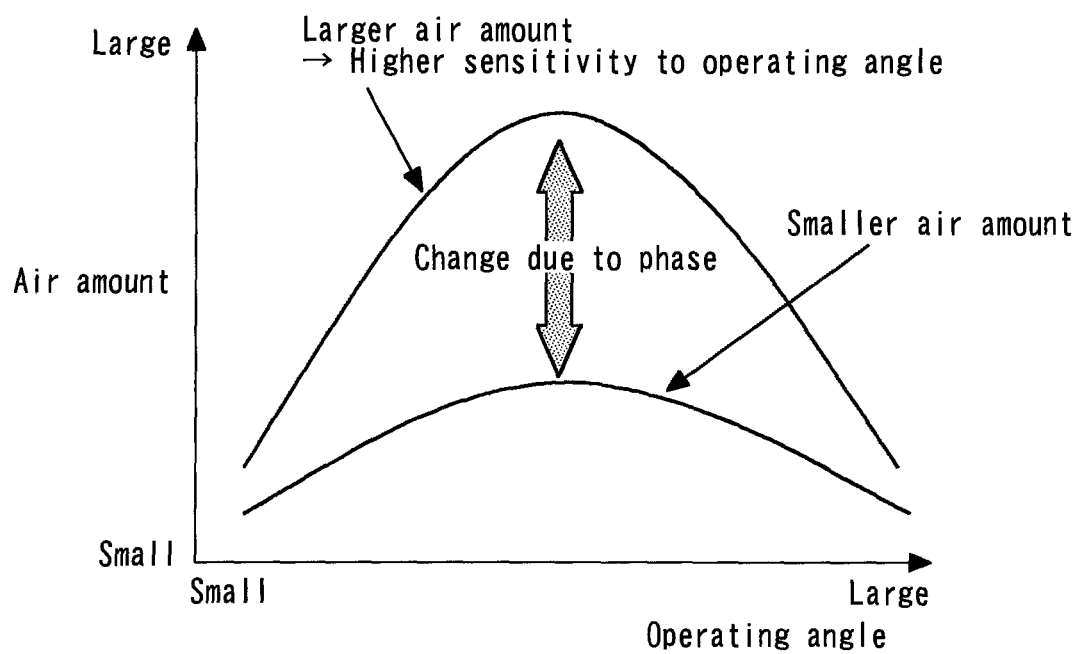
FIG. 5 is a diagram to explain the effect of the rotational phase of an intake cam on the sensitivity of intake air amount with respect to the change of the operating angle of the intake valve.

FIG. 5 is a diagram to explain the effect of the rotational phase of the intake cam 32 on the sensitivity of the intake air amount with respect to the change of the operating angle of the intake valve 24. As shown in FIG. 5, as the phase of the intake cam 32 changes, the sensitivity of the intake air amount with respect to the change of the operating angle changes. To be specific, when the phase is adjusted such that the intake air amount increases, the change amount of the intake air amount with respect to the change of the operating angle increases, that is, the sensitivity increases. As a result, the absolute value of the intake air amount increases, thereby enabling to improve the detection accuracy of the valve timing deviation. The phase of the intake cam 32 is normally set at an appropriate value taking into consideration of exhaust emissions and fuel economy under individual operating conditions of the internal combustion engine 10. Herein, the adjustment of the phase of the intake cam 32 (the advance of the phase in the case shown in FIG. 4) is executed in such a way to obtain a phase at which the intake air amount is increased (is maximized) from the state in which the phase is set at a value as described above.

Further, at the time point of starting the learning of the present embodiment, it is unknown to what degree the valve timing (operating angle) of the intake valve 24 is deviated in either of the left or right direction in FIG. 3 with respect to the reference characteristic in FIG. 3. In this case, if the operating angle is inadvertently shifted without due consideration in a direction in which the actual compression ratio of the internal combustion engine 10 decreases, the compression end temperature is decreased. As a result, there is a risk that white smoke and misfire may occur in the internal combustion engine 10.

Accordingly, it is arranged such that when starting the learning of the present embodiment, first, the operating angle (command value) of the intake valve 24 is shifted by a predetermined amount in a direction in which the actual compression ratio increases, as shown in FIG. 4(C). Thereafter, the operating angle command value is shifted in the opposite direction (that is, in the direction in which the actual compression ratio decreases) as needed. It is arranged in the present learning method such that through such adjustment of the operating angle command value, the change of the intake air amount associated with the change of the operating angle command value is detected as shown in FIG. 4(D), and a peak value (maximum value) and two points in front and back thereof at which the intake air amount is decreased by a predetermined amount are stored. Moreover, the correction of the fuel injection amount is performed such that the torque of the internal combustion engine 10 is not changed due to such a change of the operating angle command value.

Upon the end of acquisition of the detection value of the intake air amount as described above, through backward calculation from operating angle command values of two points in front and back at which the intake air amount is decreased by a predetermined amount with respect to a peak point, an intermediate value which is at an equal distance from the two points is calculated as the maximum operating angle command value. Then, the correction of the operating angle command value is executed such that the difference between the maximum operating angle command value in the detection characteristic obtained by the present learning and the maximum operating angle command value in the reference characteristic shown in FIG. 3 is eliminated, that is, such that the valve timing deviation is eliminated. This enables to correct the valve timing (closing timing IVC) of the intake valve 24 to an aimed value.

Figure 6:
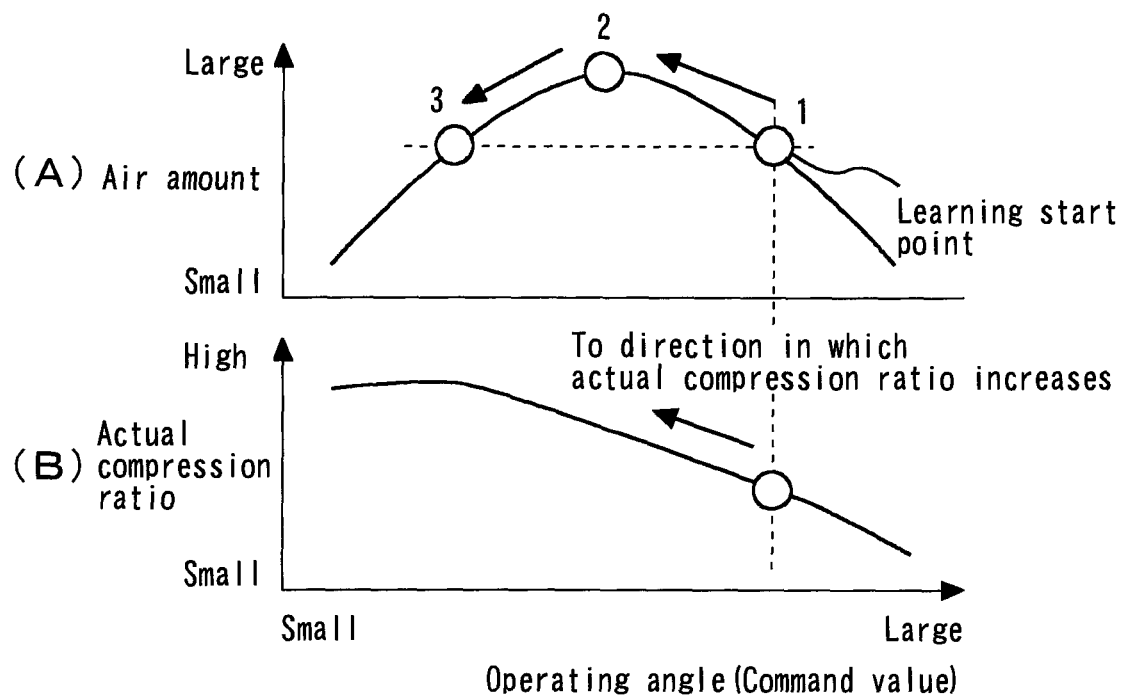
FIG. 6 is a diagram to explain a concrete adjustment method of an operating angle command value to be performed for acquiring a maximum operating angle command value.

FIG. 6 is a diagram to explain a concrete adjustment method of the operating angle command value to be performed for acquiring a maximum operating angle command value.

The internal combustion engine 10 which is a diesel engine is configured such that the closing timing of the intake valve 24 is controlled basically to be a value on the retard side to the intake bottom dead center. Therefore, during learning of the present embodiment, controlling the operating angle to be decreased causes the actual compression ratio to become higher, as shown in FIG. 6(B). The case of FIG. 6 shows an example in which when the operating angle is decreased to increase the actual compression ratio, the intake air amount increases.

To be specific, in the case shown in FIG. 6, upon the start of the present learning, an intake air amount (air amount 1) and an operating angle command value (operating angle 1) at the start of learning are acquired, and thereafter the work angle command value is adjusted in a direction in which the operating angle decreases. Thereafter, when an air amount 2 at which the intake air amount is judged to indicate a maximum value is acquired, the operating angle command value remains to be controlled in the same direction until an air amount 3 is acquired at which the intake air amount is decreased with respect to the air amount 2 by the same amount as the difference between the air amount 1 and the air amount 2. Then, an operating angle 3 which is the operating angle command value when the air amount 3 is obtained is acquired. Then, an operating angle command value which is at an equal distance from the operating angle 1 and the operating angle 3 is calculated as the maximum operating angle command value.

Figure 7:
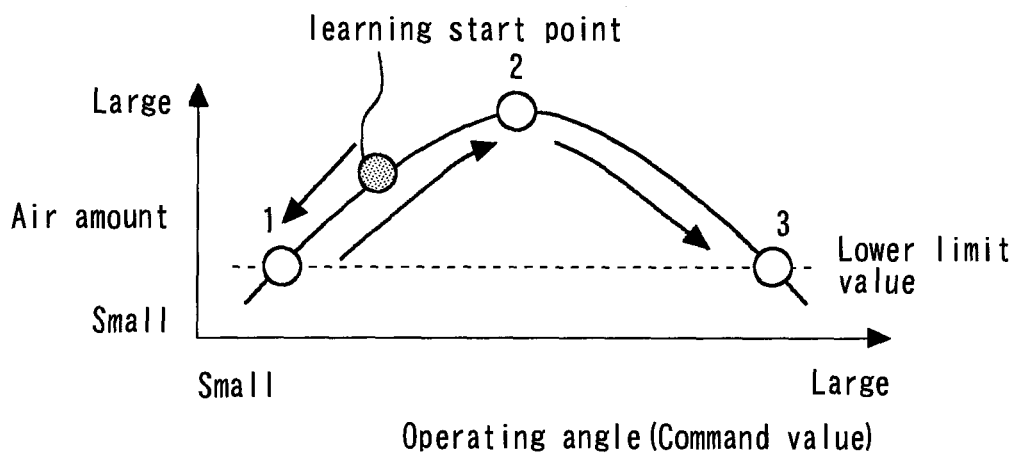
FIG. 7 is a diagram to explain a concrete adjustment method of the operating angle command value to be performed for acquiring the maximum operating angle command value.

FIG. 7 is a diagram to explain a concrete adjustment method of the operating angle command value to be performed for acquiring the maximum operating angle command value.

The case shown in FIG. 7 is an example in which the intake air amount decreases when the operating angle is decreased to increase the actual compression ratio at the start of the present learning. In such a case, if the intake air amount remains to be decreased by the operating angle being endlessly decreased, the air fuel ratio in the cylinder becomes very rich and smoke is generated.

Therefore, in the present embodiment, the range in which the operating angle command value is adjusted is limited such that the intake air amount does not coincide with a value at or lower than a lower limit value. As a result, as shown in FIG. 7, when the operating angle command value is controlled until the intake air amount reaches the air amount 1 which is a lower limit value after the start of the present learning, the operating angle command value is adjusted in the direction opposite to that up to that time. In the case shown in FIG. 7, when it is detected that the intake air amount has been decreased by the adjustment of the operating angle command value, it is possible to judge that the maximum operating angle command value at which the intake air amount indicates a maximum value is in the opposite side to the current adjustment direction. In this case, after the operating angle command value is shifted in the same direction until the intake air amount reaches its lower limit value 1, the operating angle command value is controlled in the opposite direction in such a form to interpose a maximum value of the intake air amount, thereby acquiring the operating angle 3 at the air amount 3 which is equal in amount to the air amount 1. Then, using the operating angle 1 and the operating angle 3, a maximum operating angle command value is calculated as in the case shown in FIG. 6.

[Concrete Processing in the First Embodiment]

FIG. 8 is a flowchart of the routine to be executed by the ECU 40 in the first embodiment to implement a correction method of the valve timing deviation of the variable operating angle mechanism 28a so far described.

In the routine shown in FIG. 8, first, it is determined whether or not a predetermined execution condition for executing the correction of the valve timing deviation of the intake valve 24 is established (step 100). To be specific, a setting is made such that the correction of the valve timing deviation is executed initially at the time of shipping from the factory, and thereafter at every predetermined travel distance of the vehicle which is decided taking into consideration of a wear rate and the like of the components of the variable operating angle mechanism 28a. In this step 100, if it is determined that such an execution timing has arrived, and the current operating state of the internal combustion engine 10 is in a steady state operating state such as an idling state, it is determined that the above described execution condition is established.

If the above described execution condition is established, a phase for learning is set to a target phase (phase command value) of the intake cam 32 by the variable phase mechanism 28b (step 102). This phase for learning is a value set as the value which maximizes the intake air amount at the operating condition when the above described execution condition is established, for each operating condition of the internal combustion engine 10. In this case, the variable phase mechanism 28b is controlled to realize the above described phase for learning. Next, it is determined whether or not the phase of the intake valve 24 has converged to the above described target phase, by making use of the output of the intake cam angle sensor 38 (step 104).

As a result, if it is determined that the phase has converged, an air amount 1 and an operating angle 1, which are the intake air amount and the operating angle command value at the current time, are acquired and stored before starting learning (step 106). Next, to adjust the operating angle in a direction in which the actual compression ratio increases, a process to reduce the operating angle by a predetermined amount is executed (step 108). Then, an air amount 2 at the time when the operating angle is adjusted in this step 108 is acquired and stored (step 110).

Next, it is determined whether the air amount 2 acquired in step 110 described above is larger than the sum of the air amount 1 at the start of learning which is acquired in step 106 described above and a predetermined hysteresis (step 112). As a result, if the present determination is positive, that is, when it is the case where the intake air amount increases in association with the adjustment of the operating angle command value (the case shown in FIG. 6), a series of processes in steps 114 to 126 as described below are executed.

First, in step 114, a process to further reduce the operating angle by a predetermined amount is executed. Next, the air amount and the operating angle (command value) at the time when the operating angle is adjusted in this step 114 are acquired and stored (step 116).

Next, it is determined whether or not the change amount in air amount between latest two points is not more than a predetermined value (step 118). As a result, while it is determined in step 118 that the latest change amount of the air amount is larger than the above described predetermined value, the processes after step 114 described above are repeatedly executed. On the other hand, when the determination of this step 118 is positive, that is, when it can be judged that the intake air amount during control by a current operating angle is around a peak value (maximum value) from the result that the latest change amount of the air amount becomes not more than the above described predetermined value, the air amount of this time (the latest) is stored as the maximum air amount (step 120).

Next, the process to reduce the operating angle by a predetermined amount is executed (step 122). Next, the air amount 3 and the operating angle (command value) 3 at the time when the operating angle is adjusted in step 122 are acquired and stored (step 124). Next, it is determined whether or not the air amount 3 which is acquired this time is not more than the air amount 1 acquired in step 106 described above (step 126).

As a result, if the determination in step 126 described above is negative, that is, if the air amount 3 after the air amount passed a maximum air amount has not reached yet a value equal to the air amount 1, the processes after step 122 described above are repeatedly executed. On the other hand, if the determination of this step 126 is positive, that is, if the air amount 3 has reached a value equal to the air amount 1, then, a peak operating angle when the intake air amount indicates a maximum value, that is, the above described maximum operating angle command value is calculated as an intermediate value which is at an equal distance from the operating angle 1 and the operating angle 3 (step 128).

Next, based on the peak operating angle (maximum operating angle command value) calculated in step 128 described above, a deviation amount of the valve timing (operating angle) of the intake valve 24 is calculated (step 130). The ECU 40 stores a maximum operating angle command value in the reference characteristic (see FIG. 3) of the variable operating angle mechanism 28a for each operating condition of the internal combustion engine 10. In this step 130, a difference between the maximum operating angle command value in the detection characteristic of this time calculated in step 128 described above, and a maximum operating angle command value (ECU stored value) in the reference characteristic corresponding to an operating condition when the routine is activated this time is calculated as a deviation amount of the valve timing. Next, the correction of operating angle command value is executed such that the calculated deviation amount of the valve timing is eliminated (step 132).

On the other hand, if the determination of step 112 described above is negative, that is, if it is a case where the intake air amount decreases in association with the adjustment of operating angle command value (the case shown in FIG. 7 described above), a series of processes of steps 134 to 148 described below will be executed.

First, in step 134, the process to further reduce the operating angle by a predetermined amount is executed. Next, an air amount and an operating angle (command value) at the time when the operating angle is adjusted in this step 134 are acquired and stored (step 136).

Next, it is determined whether or not the air amount acquired in step 136 described above is not more than a predetermined lower limit value 1 (step 138). The lower limit value 1 in this step 138 is a value which is preset for each operating condition such that smoke does not occur during the present learning. While it is determined in this step 138 that the air amount is more than the above described lower limit value 1, the processes after step 134 described above are repeatedly executed. On the other hand, if the determination of this step 138 is positive, the air amount and the operating angle (command vale) of this time are stored as the air amount 1 and the operating angle 1 (step 140).

Next, contrary to what has been described so far, a process to expand the operating angle by a predetermined amount is executed (step 142). Next, the air amount and the operating angle (command value) at the time when the operating angle is adjusted in this step 142 are acquired and stored (step 144). Next, it is determined whether or not the air amount acquired this time is not more than the air amount 1 acquired in step 106 described above (step 146).

As a result, if the determination of step 146 described above is negative, that is, if the air mount after the expansion of the operating angle has not reached yet a value equal to the air amount 1, the processes after step 142 described above are repeatedly executed. On the other hand, if the determination of this step 146 is positive, that is, if the air amount after the operating angle expansion has reached a value equal to the air amount 1, the operating angle (command value) when the air amount is adjusted this time is stored as the operating angle 3 (step 148).

Even in a case where the operating angle 1 and the operating angle 3 are acquired by the processes of steps 134 to 148 described above, the calculation of the peak operating angle (maximum operating angle command value) (step 128), the calculation of the deviation amount of the valve timing (operating angle) of the intake valve 24 (step 130), and the correction of the operating angle command value for eliminating the deviation amount of the valve timing (step 132) are executed, respectively, as in the case where processes of steps 114 to 126 described above are performed.

According to the routine shown in FIG. 8 described so far, operating angle command values (operating angles 1 and 3) of two points in front and back are obtained at which the intake air amount is decreased by a predetermined amount with respect to the value which is judged to be a peak value (maximum value) of the intake air amount when the operating angle (command value) is kept changing. Then, an intermediate value which is at an equal distance from the operating angle command values of these two points is calculated as the maximum operating angle command value. This makes it possible to accurately acquire a maximum operating angle command value which is an operating angle command value when the characteristics of the intake air amount with respect to the change of the operating angle (command value) indicates a peak value (maximum value). Then, by comparing this maximum operating angle command value and the reference characteristic, the calculation of the deviation amount of the valve timing and the correction of the deviation are executed. Therefore, according to the method of the present embodiment, it is possible to accurately correct the deviation of the valve timing (closing timing) of the intake valve 24 caused by the variable operating angle mechanism 28*a*.

Moreover, the intake air amount is also changed by the phase of the intake cam 32 being controlled by the variable phase mechanism 28*b*. The learning process of the present embodiment so far described is started in a state in which the phase of the intake cam 32 which is adjusted by the variable phase mechanism 28*b* is fixed. Thus, it is possible to accurately correct the deviation of the valve timing caused by the variable operating angle mechanism 28*a* without being affected by the adjustment of the variable phase mechanism 28*b*.

Further, according to the above described routine, the learning process of the present embodiment is started in a state in which the target phase (phase command value) of the intake cam 32 by the variable phase mechanism 28*b* is set at a phase for learning. This phase for learning is a value set as a value that maximizes the intake air amount. Using such a phase for learning enables to improve the sensitivity of the intake air amount with respect to the change of operating angle command value, thereby improving the detection accuracy of the valve timing deviation.

Moreover, according to the above described routine, upon starting the above described learning process, first, the adjustment of operating angle (command value) of the intake valve 24 is executed in a direction in which the actual compression ratio increases. This enables to prevent the compression end temperature from declining, and white smoke and misfire from occurring due to an inadvertent adjustment of the operating angle during the execution of learning process.

Moreover, according to the above described routine, the adjustment range of operating angle (command value) is limited such that the intake air amount does not become equal to or less than the lower limit value 1. This enables to prevent the occurrence of smoke and misfire, and the deterioration of drivability.

Moreover, as already described, in the present embodiment, the correction of the fuel injection amount is performed such that the torque of the internal combustion engine 10 is not changed by changing the operating angle (command value). In the internal combustion engine 10 which is a diesel engine that injects fuel directly into the cylinder, even if the intake air amount is changed by the operating angle of the intake valve 24 being changed, it is possible to separately control the torque by the adjustment of the fuel injection amount. Thus, by correcting the fuel injection amount such that the torque does not change when the operating angle is changed during the above described learning process, it is possible to prevent the drivability of the internal combustion engine 10 from deteriorating in association with the execution of the above describe learning process.

Further, according to the above described routine, the above described learning process is executed during a steady state operation of the internal combustion engine 10. Thus, by executing the learning process under the condition in which the operating state of the internal combustion engine 10 is stabilized, it becomes possible to accurately detect the deviation of the valve timing.

It is noted that in the first embodiment, which has been described above, the "operating angle control means" in the first aspect of the present invention is implemented by the ECU 40 executing the processes of steps 108, 114, 122, 134, and 142 described above; the "air amount acquisition means" in the first aspect of the present invention by executing the process of step 106, 110, 116, 124, 136, or 144 described above; the "estimation means" in the first aspect of the present invention by executing the processes of steps 102 to 112, steps 114 to 126 (or 134 to 148), and step 128 described above; and the "correction means" in the first aspect of the present invention by executing the processes of steps 130 and 132 described above, respectively.

Further, the "phase control means" in the second aspect of the present invention is implemented by the ECU 40 controlling the variable phase mechanism 28*b*, and the "phase locking control means" in the second aspect of the present invention by executing the processes of steps 102 and 104 described above, respectively.

Further, the phase for learning in step 102 described above corresponds to the "fixed value" in the third aspect of the present invention.

Further, the "maximum command value calculation means" in the fifth aspect of the present invention is implemented by the ECU 40 executing the process of step 128 described above.

Further, the "command value changing means" in the sixth aspect of the present invention is implemented by the ECU 40 reducing, not expanding, the operating angle command value in step 106 described above.

Further, the "command-value change restriction means" in the seventh aspect of the present invention is implemented by the ECU 40 executing the processes of steps 134 to 140 described above.

Furthermore, the "injection amount adjustment means" in the ninth aspect of the present invention is implemented by the ECU 40 adjusting the fuel injection amount such that the torque of the internal combustion engine 10 will not change, in parallel with the processes of the routine shown in FIG. 8 described above.

Second Embodiment

Next, referring to FIGS. 9 to 11, a second embodiment of the present invention will be described.

The system of the present embodiment can be implemented by causing the ECU 40 to execute the routine shown FIG. 11 described below in place of the routine shown in FIG. 8 by using the hardware configuration shown in FIG. 1.

FIG. 9 is a timing chart to explain the detection (learning) method of the deviation amount of the valve timing according to the second embodiment of the present invention.

The operating angle learning in FIG. 9 is similar to the learning method of the deviation of the valve timing by the variable operating angle mechanism 28a in the first embodiment described above. The present embodiment is characterized in that after the execution of such operating angle learning, a phase learning for correcting the deviation of the valve timing of the intake valve 24 caused by the variation of the variable phase mechanism 28b is executed. It is noted that although herein the phase learning is executed after the execution of the operating angle learning, the execution order of these learning may be reversed.

The phase learning of the present embodiment is also executed during a steady state operation (for example, during idling) in which the engine rotational speed (and torque) is stabilized as shown in FIG. 9(A). Moreover, it is arranged such that upon execution of the phase learning, as shown in FIG. 9(C), the operating angle of the intake valve 24 is adjusted so as to be an operating angle which causes the intake air amount to further increase (preferably, to be maximized) under the current operating condition, by using the variable operating angle mechanism 28a, before changing the phase command value for the variable phase mechanism 28b. Then, it is arranged such that during execution of the present phase learning, the variable operating angle mechanism 28a is stopped such that the operating angle of the intake valve 24 is held at the above described operating angle.

Figure 10:
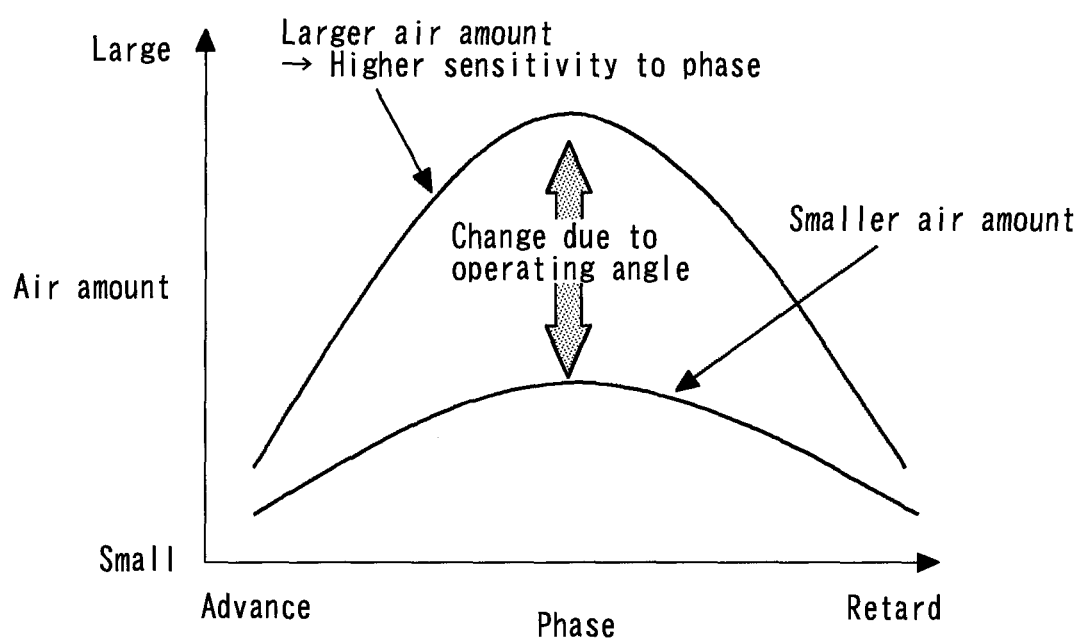
FIG. 10 is a diagram to explain the effect of the operating angle of the intake valve on the sensitivity of the intake air amount with respect to the change of the rotational phase of the intake cam.

FIG. 10 is a diagram to explain the effect of the operating angle of the intake valve 24 on the sensitivity of the intake air amount with respect to the change of the rotational phase of the intake cam 32. As shown in FIG. 10, as the operating angle of the intake valve 24 changes, the sensitivity of the intake air amount with respect to the change of the phase changes. To be specific, when the operating angle is adjusted such that the intake air amount increases, the change amount of the intake air amount with respect to the change of the phase increases, that is, the sensitivity increases. As a result, the absolute value of the intake air amount increases, thereby enabling to improve the detection accuracy of the valve timing deviation. The operating angle of the intake valve 24 is normally set at an appropriate value taking into consideration of exhaust emissions and fuel economy under individual operating conditions of the internal combustion engine 10. Herein, the adjustment of the operating angle of the intake valve 24 (expansion of the operating angle in the case shown in FIG. 9) is executed in such a way to obtain an operating angle at which the intake air amount is increased (is maximized) from the state in which the operating angle is set at such a value as described above.

Further, it is arranged in the present invention such that when starting the phase learning, first, the phase (command value) of the intake cam 32 is shifted by a predetermined amount in a direction in which the intake air amount increases as shown in FIG. 9(B). This is based on the same idea as in the case where when starting the operating angle learning, first, the operating angle (command value) is shifted by a predetermined amount in a direction in which the actual compression ratio increases, and for preventing the occurrence of smoke and misfire due to a decline of compression end temperature caused by an inadvertent shifting of the phase. Moreover, it is arranged such that the correction of the fuel injection amount is performed even during the phase learning such that the torque of the internal combustion engine 10 is not changed by such changing of the phase command value.

Moreover, during the phase learning, the acquisition method of a maximum phase command value at which the intake air amount indicates a maximum value when the phase command value is changed, the calculation method of the deviation amount of the valve timing (phase) based on the maximum phase command value, and the correction method of the deviation of the valve timing are the same as those during the operating angle learning. The details of these methods will be described with reference to the routine shown in FIG. 11 described below. By performing the phase learning as described so far, it is possible to correct the phase of the intake cam 32 (the valve timing of the intake valve 24) to an aimed value.

[Concrete Processing in the Second Embodiment]

FIG. 11 is a flowchart of the routine to be executed by the ECU 40 in the second embodiment to implement a correction method of the valve timing deviation of the variable phase mechanism 28b so far described.

In the routine shown in FIG. 11, first, it is determined whether or not a predetermined execution condition for executing the correction of the valve timing deviation by the variable phase mechanism 28b is established, by similar processing to that of step 100 described above (step 200).

If the above described execution condition is established, an operating angle for learning is set to a target operating angle (operating angle command value) of the intake valve 24 by the variable operating angle mechanism 28a (step 202). This operating angle for learning is a value set as the value which maximizes the intake air amount at the operating condition when the above described execution condition is established, for each operating condition of the internal combustion engine 10. In this case, the variable operating angle mechanism 28a is controlled to realize the above described operating angle for learning. Next, it is determined whether or not the operating angle of the intake valve 24 has converged to the above described target operating angle (step 204). The determination of this step 204 can be executed, for example, by making use of the output of a rotational position detection sensor (not shown) of the control shaft 28a1 included in the variable operating angle mechanism 28a.

As a result, if it is determined that the operating angle has converged, an air amount 1 and a phase 1, which are the intake air amount and the phase command value at the current time, are acquired and stored before starting the phase learning (step 206). Next, to adjust the phase in a direction in which the intake air amount increases, herein, a process to retard the phase by a predetermined amount is executed (step 208). Then, an air amount 2 at the time when the phase is adjusted in this step 208 is acquired and stored (step 210).

Next, it is determined whether the air amount 2 acquired in step 200 described above is larger than the sum of the air amount 1 at the start of learning which is acquired in step 206 described above and a predetermined hysteresis (step 212). As a result, if the present determination is positive, that is, when it is the case where the intake air amount increases in association with the adjustment of the phase command value (the case similar to that shown in FIG. 6), a series of processes in steps 214 to 226 as described below are executed.

First, in step 214, a process to further retard the phase by a predetermined amount is executed. Next, the air amount and the phase (command value) at the time when the phase is adjusted in this step 214 are acquired and stored (step 216).

Next, it is determined whether or not the change amount in air amount between latest two points is not more than a predetermined value (step 218). As a result, while it is determined in the step 218 that the latest change amount of the air amount is larger than the above described predetermined value, the processes after step 214 described above are repeatedly executed. On the other hand, when the determination of this step 218 is positive, that is, when it can be judged that the intake air amount during control by a current phase is around a peak value (maximum value) from the result that the latest change amount of the air amount becomes not more than the above described predetermined value, the air amount of this time (the latest) is stored as the maximum air amount (step 220).

Next, the process to reduce the phase by a predetermined amount is executed (step 222). Next, an air amount 3 and a phase (command value) 3 at the time when the phase is adjusted in step 222 are acquired and stored (step 224). Next, it is determined whether or not the air amount 3 which is acquired this time is not more than the air amount 1 acquired in step 206 described above (step 226).

As a result, if the determination in step 226 described above is negative, that is, if the air amount 3 after the air amount passed a maximum air amount has not reached yet a value equal to the air amount 1, the processes after step 222 described above are repeatedly executed. On the other hand, if the determination of this step 226 is positive, that is, if the air amount 3 has reached a value equal to the air amount 1, then, a peak phase when the intake air amount indicates a maximum value, that is, the above described maximum phase command value is calculated as an intermediate value which is at an equal distance from the operating angle 1 and the operating angle 3 (step 228).

Next, based on the peak phase (maximum phase command value) calculated in step 228 described above, a deviation amount of the valve timing of the intake valve 24 (phase of the intake cam 32) is calculated (step 230). The ECU 40 stores a maximum phase command value in the reference characteristic of the variable phase mechanism 28b (the relation of the figure obtained by replacing the operating angle of the abscissa of FIG. 3 with the phase) for each operating condition of the internal combustion engine 10. In this step 230, a difference between the maximum phase command value in the detection characteristic of this time calculated in step 228 described above, and the maximum phase command value (ECU stored value) in the reference characteristic corresponding to the operating condition when the routine is activated this time is calculated as a deviation amount of the valve timing. Next, the correction of the phase command value is executed such that the calculated deviation amount of the valve timing is eliminated (step 232).

On the other hand, if the determination of step 212 described above is negative, that is, if it is a case where the intake air amount decreases in association with the adjustment of the phase command value (a case similar to the case shown in FIG. 7 described above), a series of processes of steps 234 to 248 described below will be executed.

First, in step 234, a process to further retard the phase by a predetermined amount is executed. Next, an air amount and a phase (command value) at the time when the phase is adjusted in this step 234 are acquired and stored (step 236).

Next, it is determined whether or not the air amount acquired in step 236 described above is not more than a predetermined lower limit value 1 (step 238). The lower limit value 1 in this step 238 is a value which is preset for each operating condition such that smoke does not occur during the present learning. While it is determined in this step 238 that the air amount is more than the above described lower limit value 1, the processes after step 234 described above are repeatedly executed. On the other hand, if the determination of this step 238 is positive, the air amount and the phase (command vale) of this time are stored as the air amount 1 and the phase 1 (step 240).

Next, contrary to what has been described so far, a process to advance the phase by a predetermined amount is executed (step 242). Next, the air amount and the phase (command value) at the time when the phase is adjusted in this step 242 are acquired and stored (step 244). Next, it is determined whether or not the air amount acquired this time is not more than the air amount 1 acquired in step 206 described above (step 246).

As a result, if the determination of step 246 described above is negative, that is, if the air mount after the advance of the phase has not reached yet a value equal to the air amount 1, the processes after step 242 described above are repeatedly executed. On the other hand, if the determination of this step 246 is positive, that is, if the air amount after the advance of the phase has reached a value equal to the air amount 1, the phase (command value) when the air amount is adjusted this time is stored as a phase 3 (step 248).

Even in a case where the phase 1 and the phase 3 are acquired by the processes of steps 234 to 248 described above, the calculation of the peak phase (maximum phase command value) (step 228), the calculation of the deviation amount of the valve timing of the intake valve 24 (phase of the intake cam 32) (step 230), and the correction of the phase command value for eliminating the deviation amount of the valve timing (step 232) are executed, as in the case where processes of steps 214 to 226 described above are performed.

According to the routine shown in FIG. 11 described so far, phase command values (phases 1 and 3) of two points in front and back are obtained at which the intake air amount is decreased by a predetermined amount with respect to the value which is judged to be a peak value (maximum value) of the intake air amount. Then, an intermediate value which is at an equal distance from the phase command values of these two points is calculated as the maximum phase command value. This makes it possible to accurately acquire a maximum phase command value which is a phase command value when the characteristics of the intake air amount with respect to the change of the phase (command value) indicates a peak value (maximum value). Then, by comparing this maximum phase command value and the reference characteristic, the calculation of the deviation amount of the valve timing and the correction of the deviation are executed. Therefore, according to the method of the present embodiment, it is possible to accurately correct the deviation of the valve timing of the intake valve 24 caused by the variable phase mechanism 28b. Further, by executing the correction process of the valve timing deviation by such variable phase mechanism 28b in addition to the correction process of the valve timing deviation by the variable operating angle mechanism 28a, it is possible to improve the accuracy of correction of the valve timing deviation as a whole of the intake variable valve operating apparatus 28.

Moreover, the intake air amount is also changed by the operating angle of the intake valve 24 being controlled by the variable operating angle mechanism 28a as already described in the first embodiment. The phase learning process of the present embodiment so far described is started in a state in which the operating angle of the intake valve 24 which is adjusted by the variable operating angle mechanism 28a is fixed. Thus, it is possible to accurately correct the deviation of the valve timing caused by the variable phase mechanism 28b without being affected by the adjustment of the variable operating angle mechanism 28a.

Further, according to the above described routine, the phase learning process of the present embodiment is started in a state in which the target operating angle (operating angle command value) of the intake valve 24 by the variable operating angle mechanism 28a is set at an operating angle for learning. This operating angle for learning is a value set as a value that maximizes intake air amount. Using such an operating angle for learning enables to improve the sensitivity of the intake air amount with respect to the change of the phase command value, thereby improving the detection accuracy of the valve timing deviation.

Moreover, according to the above described routine, upon starting the above described phase learning process, first, the adjustment of the phase (command value) of the intake cam 32 is executed in a direction in which the intake air amount increases. This enables to prevent the compression end temperature from decreasing and white smoke and misfire from occurring due to an inadvertent adjustment of the phase during the execution of the phase learning process.

Moreover, according to the above described routine, the adjustment range of the phase (command value) is limited such that the intake air amount does not become equal to or less than a lower limit value 1. This enables to prevent the occurrence of smoke and misfire, and the deterioration of drivability.

Moreover, as already described, in the present embodiment, the correction of the fuel injection amount is performed such that the torque of the internal combustion engine 10 is not changed by changing the phase (command value). This enables to prevent the drivability of the internal combustion engine 10 from deteriorating in association with the execution of the above described phase learning process.

Further, according to the above described routine, the above described phase learning process is executed during a steady state operation of the internal combustion engine 10. Thus, by executing the phase learning process under the condition in which the operating state of the internal combustion engine 10 is stabilized, it becomes possible to accurately detect the deviation of the valve timing.

It is noted that in the second embodiment, which has been described above, the "second estimation means" in the eighth aspect of the present invention and the "estimation means" in the thirteenth aspect of the present invention are implemented by the ECU 40 executing the processes of steps 202 to 212, steps 214 to 226 (or 234 to 248), and step 228 described above; the "second correction means" in the eighth aspect of the present invention and the "correction means" in the thirteenth aspect of the present invention by executing the processes of steps 230 and 232 described above; and the "operating angle locking control means" in the eighth or fourteenth aspect of the present invention by executing the processes of steps 202 and 204 described above, respectively.

Furthermore, the "second injection amount adjustment means" in the tenth aspect of the present invention and the "injection amount adjustment means" in the twenty-first aspect of the present invention are implemented by the ECU 40 adjusting the fuel injection amount such that the torque of the internal combustion engine 10 will not change, in parallel with the process of the routine shown in FIG. 11 described above.

Further, the "phase control means" in the aspect of the thirteenth aspect of the present invention is implemented by the ECU 40 executing the processes of steps 208, 214, 222, 234, and 242 described above; and the "air amount acquisition means" in the thirteenth aspect of the present invention is implemented by executing the process of step 206, 210, 216, 224, 236, or 244 described above, respectively.

Further, the "operating angle control means" in the fourteenth aspect of the present invention is implemented by the ECU 40 controlling the variable operating angle mechanism 28a.

Further, the phase for learning in step 202 described above corresponds to the "fixed value" in the fifteenth aspect of the present invention.

Further, the "maximum command value calculation means" in the seventeenth aspect of the present invention is implemented by the ECU 40 executing the process of step 228 described above.

Further, the "command value changing means" in the eighteenth aspect of the present invention is implemented by the ECU 40 retarding, not advancing, the phase command value in step 206 described above.

Further, the "command-value change restriction means" in the nineteenth aspect of the present invention is implemented by the ECU 40 executing the processes of steps 234 to 240 described above.

In the first and second embodiments, which have been described above, it is arranged such that a maximum operating angle command value (or a maximum phase command value) is calculated (estimated) based on operating angle command values (or phase command values) of two points in front and back at which the intake air amount is decreased by a predetermined amount with respect to a value which is judged to be a peak value (maximum value) of the intake air amount when the operating angle command value (or phase command value) is kept changing. However, in the present invention, the method of estimating a maximum operating angle command value (maximum phase command value) based on operating angle command values (or phase command values) of at least two points is not limited to the above described method and may be, for example, the following method. It is noted that while hereafter description will be made taking the example of the correction of the deviation of the valve timing for the variable operating angle mechanism, the same idea is utilized to perform the correction of the deviation of the valve timing for the variable phase mechanism.

That is, the present invention may be a method of estimating a maximum operating angle command value based on acquired values of two points of the intake air amount during the control of the operating angle of the intake valve based on each of the operating angle command values of two points. To be more specific, in the relation between the change amount of the operating angle command values of the above described two points, and the change amount of intake air amount in association with such change of the operating angle command value, a map (omitted from illustration) that defines a deviation amount between the operating angle command value of either one point of the above described two points of operating angle command values and the maximum operating angle command value in the reference characteristic is acquired in advance from an experiment or the like. Then, with reference to such map during the operating angle learning, the above described deviation amount is calculated from the change amount of the operating angle command values of the above described two points, and the change amount of the intake air amount.

Further, it is determined on which of the right and left sides of FIG. 3 described above, the operating angle command values of the above described two points are located with respect to the maximum operating angle command value of the detection characteristic of this time based on the sign of the change amount of the operating angle command value, and the sign of the change amount of the intake air amount (information to show whether the intake air amount has increased or decreased). For example, in the case where the operating angle command value is changed in a direction in which the operating angle decreases, if the sign of the change amount of the intake air amount is positive (that is, the intake air amount has increased in association with the change of the operating angle command value), it is possible to grasp that the operating angle command values of the above described two points are positioned on the right side of FIG. 3 described above with respect to the maximum operating angle command value of the detection characteristic of this time.

According to the method as described so far, it is possible to estimate a maximum operating angle command value based on acquired values of the intake air amount at two points during the control of the operating angle of the intake valve based on each of the operating angle command values of two points. Further, according to such a method, a simplistic estimation of the maximum operating angle command value becomes possible with a small number of data points and with a small change amount of the operating angle command value. This enables to perform the learning of the deviation amount of the valve timing in a short period of time, and also enables to suppress, to a minimum level, the change in exhaust sound and combustion sound in association with the change of the operating angle for learning.

DESCRIPTION OF SYMBOLS 10 internal combustion engine
12 piston
14 combustion chamber
16 intake passage
18 exhaust passage
20 air flow meter
22 fuel injection valve
24 intake valve
26 exhaust valve
28 intake variable valve operating apparatus
28a variable operating angle mechanism
28a1 control shaft
28b variable phase mechanism
30 crankshaft
32 intake cam
34 crank angle sensor
36 intake camshaft
38 intake cam angle sensor
40 ECU (Electronic Control Unit)

The invention claimed is:

1. A control apparatus for an internal combustion engine, comprising:
a variable operating angle mechanism which makes an operating angle of an intake valve variable;
operating angle control means which controls the variable operating angle mechanism based on an operating angle command value relating to the operating angle of the intake valve;
air amount acquisition means which acquires an intake air amount of the internal combustion engine;
estimation means which estimates a maximum operating angle command value at which the intake air amount indicates a maximum value in association with a change of the operating angle command value, based on a value of the intake air amount acquired during a control of the operating angle of the intake valve based on each of the operating angle command values of at least two points; and
correction means which corrects a deviation of a valve timing of the intake valve by comparing the maximum operating angle command value estimated by the estimation means with a reference value.

2. The control apparatus for an internal combustion engine according to claim 1,
wherein the internal combustion engine further comprises:
a variable phase mechanism which makes a rotational phase of an intake cam that drives the intake valve variable with respect to a rotational phase of a crankshaft; and
phase control means which controls the variable phase mechanism based on a phase command value relating to the rotational phase of the intake cam, and
wherein the phase control means includes phase locking control means for controlling the variable phase mechanism such that the rotational phase of the intake cam coincides with a fixed value at a start of estimation of the maximum operating angle command value by the estimation means.

3. The control apparatus for an internal combustion engine according to claim 2,
wherein the fixed value is a value to which the rotational phase of the intake cam is adjusted such that an intake air amount is larger than a value at an operating condition when the estimation of the maximum operating angle command value by the estimation means is started.

4. The control apparatus for an internal combustion engine according to claim 1,
wherein the operating angle command values of the at least two points include operating angle command values of two points between which an operating angle command value exists at which an intake air amount is judged to indicate a maximum value.

5. The control apparatus for an internal combustion engine according to claim 4,
wherein the estimation means includes maximum command value calculation means for calculating, as the maximum operating angle command value, an intermediate value which is at an equal distance from the operating angle command values of the two points between which the operating angle command value exists at which an intake air amount is judged to indicate a maximum value.

6. The control apparatus for an internal combustion engine according to claim 1,
wherein the estimation means includes command value changing means for first changing the operating angle command value in a direction in which an actual compression ratio of the internal combustion engine increases, at a start of estimation of the maximum operating angle command value.

7. The control apparatus for an internal combustion engine according to claim 1,
wherein the estimation means includes command-value change restriction means for restricting change of the operating angle command value such that an intake air amount does not become equal to or less than a predetermined lower limit value at a time of estimation of the maximum operating angle command value.

8. The control apparatus for an internal combustion engine according to claim 2, further comprising:
second estimation means which estimates a maximum phase command value at which an intake air amount indicates a maximum value in association with a change of the phase command value, based on the value of the intake air amount acquired during the control of the rotational phase of the intake cam based on each of the phase command values of at least two points after the estimation of the maximum operating angle command value by the estimation means; and
second correction means which corrects a deviation of the valve timing of the intake valve by comparing the maximum phase command value estimated by the second estimation means with a second reference value,
wherein the operating angle control means includes operating angle locking control means for controlling the variable operating angle mechanism such that the operating angle of the intake valve coincides with a fixed value at a start of estimation of the maximum phase command value by the second estimation means.

9. The control apparatus for an internal combustion engine according to claim 1, further comprising:
injection amount adjustment means which adjusts a fuel injection amount such that torque of the internal combustion engine does not change in association with a change of the operating angle command value at a time of estimation of the maximum operating angle command value by the estimation means.

10. The control apparatus for an internal combustion engine according to claim 8, further comprising:
second injection amount adjustment means which adjusts a fuel injection amount such that torque of the internal combustion engine does not change in association with a change of the phase command value at a time of estimation of the phase command value by the second estimation means.

11. The control apparatus for an internal combustion engine according to claim 1,
wherein the estimation means executes the estimation of the maximum operating angle command value during a steady state operation of the internal combustion engine.

12. The control apparatus for an internal combustion engine according to claim 8,
wherein the second estimation means executes the estimation of the phase command value during a steady state operation of the internal combustion engine.

13. A control apparatus for an internal combustion engine, comprising:
a variable operating angle mechanism which makes an operating angle of an intake valve variable; and
a controller that is programmed to:
control the variable operating angle mechanism based on an operating angle command value relating to the operating angle of the intake valve;
acquire an intake air amount of the internal combustion engine;
estimate a maximum operating angle command value at which the intake air amount indicates a maximum value in association with a change of the operating angle command value, based on a value of the intake air amount acquired during a control of the operating angle of the intake valve based on each of the operating angle command values of at least two points; and
correct a deviation of a valve timing of the intake valve by comparing the maximum operating angle command value with a reference value.

* * * * *